(12) United States Patent
Lee

(10) Patent No.: US 10,934,187 B1
(45) Date of Patent: Mar. 2, 2021

(54) MULTI-IONIZER SHOWER HEAD CONTAINING PRECIOUS SERPENTINE

(71) Applicant: U-Jong Lee, Suwon (KR)

(72) Inventor: U-Jong Lee, Suwon (KR)

(73) Assignee: U-Jong Lee, Suwon-si (KR)

( * ) Notice: Subject to any disclaimer, the term of this patent is extended or adjusted under 35 U.S.C. 154(b) by 46 days.

(21) Appl. No.: 16/898,703

(22) Filed: Jun. 11, 2020

(30) Foreign Application Priority Data

Oct. 4, 2019 (KR) .................. 10-2019-0122990

(51) Int. Cl.
| | | |
|---|---|---|
| *C02F 1/48* | (2006.01) | |
| *B05B 1/18* | (2006.01) | |
| *B05B 7/04* | (2006.01) | |
| *C04B 35/14* | (2006.01) | |
| *C04B 35/626* | (2006.01) | |
| *C04B 35/632* | (2006.01) | |
| *C04B 35/64* | (2006.01) | |

(52) U.S. Cl.
CPC ............ *C02F 1/481* (2013.01); *B05B 1/18* (2013.01); *B05B 7/0416* (2013.01); *C04B 35/14* (2013.01); *C04B 35/6261* (2013.01); *C04B 35/62655* (2013.01); *C04B 35/632* (2013.01); *C04B 35/64* (2013.01); *C02F 2303/02* (2013.01); *C02F 2303/04* (2013.01); *C02F 2307/06* (2013.01); *C04B 2235/3418* (2013.01); *C04B 2235/3481* (2013.01)

(58) Field of Classification Search
CPC .. B05B 1/18; B05B 15/06; B05B 1/34; B05B 1/30; C02F 1/48; C02F 1/68; E03C 1/084
See application file for complete search history.

(56) References Cited

FOREIGN PATENT DOCUMENTS

| | | | |
|---|---|---|---|
| KR | 1020040036791 A | | 5/2004 |
| KR | 1020180032046 A | | 3/2008 |
| KR | 1020120088356 A | | 8/2012 |
| KR | 20180047272 A | * | 5/2018 |

OTHER PUBLICATIONS

KR 20180047272 A; May 2018 Korea , inventor Jang Sung Man; English translation (Year: 2018).*
Korean Office Action issued by the Korean Intellectual Property Office dated Oct. 21, 2019.

* cited by examiner

*Primary Examiner* — Cameron J Allen
(74) *Attorney, Agent, or Firm* — Harvest IP Law, LLP

(57) ABSTRACT

Disclosed herein is a multifunction shower head including a ceramic member containing precious serpentine. The ceramic member containing precious serpentine and quartz porphyry is disposed inside the shower head to generate far infrared (FIR) radiation beneficial to the skin. Precious serpentine has antibacterial and deodorizing effects to providing an effect of purifying supply water. Permanent magnets of the multi-ionizer generate ionized water, and a channel of the multi-ionizer has a trapezoidal cross-sectional shape, such that flowing water is exposed to a magnetic field generated by the permanent magnets for a longer period of time. The multi-ionizer radiates negative ions beneficial to the human body.

4 Claims, 6 Drawing Sheets

MULTI-IONIZER SHOWER HEAD CONTAINING PRECIOUS SERPENTINE

CROSS-REFERENCE TO RELATED APPLICATION

This application claims under 35 U.S.C. § 119(a) the benefit of Korean Patent Application No. 10-2019-0122990, filed on Oct. 4, 2019, the entire contents of which are incorporated herein by reference.

BACKGROUND

(a) Technical Field

The present invention relates to a multi-ionizer shower head including a ceramic member containing precious serpentine. More particularly, the present invention relates to a multi-ionizer shower head containing precious serpentine, the multi-ionizer shower head including: a shower head nozzle allowing water to be sprayed and including a ceramic member containing precious serpentine, the ceramic member being rotatably disposed in the interior of the shower head nozzle; a cylindrical shower head body, with the upper portion thereof being connected to the lower portion of the shower head nozzle, an internal channel of the shower head body allowing water be conveyed to the shower head nozzle therethrough; a multi-ionizer screw-coupled to the lower portion of the shower head body, having a permanent magnet space accommodating permanent magnets, and allowing water to flow through an internal channel thereof to produce ionized water, the multi-ionizer including a disc-shaped microbubble generator provided in a position through which water is introduced, the microbubble generator being made of the same material as the ceramic member and having a plurality of holes extending through the thickness thereof; and an adaptor, with the upper portion thereof being screw-coupled to the lower portion of the multi-ionizer, and the lower portion of the adaptor being connected to a fixed pipe or a flexible hose, wherein the multi-ionizer shower head is operated to spray warm water, the temperature of which ranges from 35° C. to 45° C.

(b) Background Art

Precious serpentine is a type of serpentine that is transparent, light black or dark blue, and glossy. Precious serpentine is also referred to as nephrite or Korean jade. In general, serpentine is an almost opaque mineral having a very low Mohs hardness value. Serpentine is used as an insulation material or a supplementary material mineral in the iron making industry. In general, serpentine is unsuitable to be processed as a gem. However, some serpentines having a Mohs hardness value ranging from 5 to 6 may be processed. Such a serpentine having a high hardness value is referred to as precious serpentine, bowenite, nephrite, or jet.

In addition, it was reported that precious serpentine may be beneficial to cardiovascular diseases, such as diabetes and hypertension, when worn on the human body, since precious serpentine contains Mg, Ca, and Fe as main ingredients. It was also reported that precious serpentine inhibits the expression of inflammation-inducing genes. J Korean Ophthalmol Soc (2018; 59(8)) "*Anti-pseudomonal Effect of a Nephrite-containing Contact Lens Storage Case*" disclosed an anti-amoeba effect obtained by adding nephrite (serpentine) to a contact lens storage container.

Related-art solutions using precious serpentine in relation to water includes Korean Patent No. 10-1219807 (Jan. 8, 2013). Korean Patent No. 10-1219807 discloses a water purifier including one or more water purifying containers A arranged in parallel or in series to filter supply water. Each of the water purifying containers A includes: a body 1 having an opening in the upper portion, a fastening portion 11 in an outer peripheral portion of the upper portion, and a holder 12 provided on the inner surface of a wall to fix a metal bar 7; a cover 2 coupled to the upper portion of the body 1; a filter 3 accommodated in the body 1 and having a first purifying material 33 filled therein; a metal mesh 6 and the metal bar 7 disposed inside the body 1 to generate hydrogen through a reaction with water; and a filtering material 5 filled in the body 1, wherein the first purifying material contains precious serpentine. Korean Patent Application Publication No. 2003-0081208 (Oct. 17, 2003) disclosed a method of fabricating a water purifying filter of a household water purifier from ceramic containing nephrite by mixing nephrite in a filter material. The filter material may include oak charcoal, bamboo charcoal, coconut charcoal, Ge ceramic, nephrite ceramic, loess ceramic, quartz porphyry ceramic that emit radiations beneficial to humans, such as infrared (IR) radiation.

In addition, recently, due to metal oxides or impurities contained in supply water, the anxiety of users is increasing. In addition, the number of skin disease patients continuously increases when the weather gets hot. Accordingly, the use of functional shower heads has come into prominence. Such a functional shower head includes a filter or an additional component added to a shower head spraying supply water to the skin of users.

PRIOR ART DOCUMENTS (Patent Document 1) Korean Patent No. 10-1219807 (2013 Jan. 8) (Patent Document 2) Korean Patent Application Publication No. 2003-0081208 (2003 Oct. 17)

SUMMARY OF THE DISCLOSURE

An objective of the present invention is to devise a multifunction shower head spraying water beneficial to the human body by including precious serpentine inside the shower head, the precious serpentine being able to assist in the inhibition of skin inflammation, having anti-pseudomonal effect, and emitting far infrared (FIR) radiation. Here, a ceramic member containing precious serpentine and additional ingredients may be provided inside the multi-ionizer shower head including precious serpentine, thereby providing the multi-ionizer shower head having improved endurance and effect.

To realize the objective of the present invention, according to an embodiment, provided is a multi-ionizer shower head including: a shower head nozzle allowing water to be sprayed and including a ceramic member containing precious serpentine, the ceramic member being rotatably disposed in an interior of the shower head nozzle; a cylindrical shower head body, with an upper portion thereof being connected to a lower portion of the shower head nozzle, an internal channel of the shower head body allowing water be conveyed to the shower head nozzle therethrough; a multi-ionizer screw-coupled to a lower portion of the shower head body, having a permanent magnet space accommodating permanent magnets, and allowing water to flow through an internal channel thereof to produce ionized water, the multi-ionizer including a disc-shaped microbubble generator provided in a position through which water is introduced, the microbubble generator being made of the same material as the ceramic member and having a plurality of holes extending through the thickness thereof; and an adaptor, with an upper portion thereof being screw-coupled to a lower portion of the multi-ionizer, and a lower portion of the adaptor being connected to a fixed pipe or a flexible hose. The multi-ionizer shower head may be operated to spray warm water, the temperature of which ranges from 35° C. to 45° C.

The multi-ionizer may include: a housing having the permanent magnet space in an outer surface and the channel in a central portion when viewed in a plan view; a cylindrical metal tube surrounding an outer surface of the housing; and upper and lower O-rings attached to upper and lower portions of the housing to prevent a water leakage. A cylindrical protrusion may extend downward from a central portion of a lower portion of the housing, threads may be formed on an outer surface of the protrusion, and the microbubble generator may be fitted into the cylindrical protrusion. The multi-ionizer may include an adaptor O-ring in close contact with the adaptor to prevent the microbubble generator from moving.

The channel of the multi-ionizer may have a trapezoidal cross-sectional shape, in which the diameter of the upper portion thereof, through which water is discharged to the shower head body, is greater than the diameter of the lower portion thereof, through which water is introduced, by a predetermined value The ceramic member may contain quartz porphyry powder, precious serpentine powder, and a binder.

A method of fabricating the ceramic member may include: inputting the quartz porphyry powder and the precious serpentine powder at a weight ratio of 6:4 to 9:1 to a ball mill mixer and mixing the quartz porphyry powder and the precious serpentine powder; inputting a mixture obtained in the mixing and water to a chamber of a spray dryer, evaporating moisture, and removing impurity to recover the dried mixture; inputting the mixture, from which the impurity is removed, and a binder by to a mold and shaping the mixture; and firing the shaped mixture, thereby fabricating a ceramic member.

The mixing may be performed for 68 to 76 hours so that the quartz porphyry powder and the precious serpentine powder have a particle size of 38 to 42 mesh and be performed by spraying the mixture and water into the chamber of the spray dryer, with the chamber having an internal temperature of 120 to 150° C. The firing may be performed at a temperature of 1150 to 1200° C. for 4 to 6 hours.

A material the same as that of the ceramic member may be attached to an inner surface of the channel of the multi-ionizer or an inner surface of the channel of the shower head body, or the housing is made of the same material as the ceramic member.

As set forth above, the multi-ionizer shower head including precious serpentine according to the present invention has the following effects.

(1) According to the present invention, the ceramic member containing precious serpentine and quartz porphyry may be disposed inside the shower head to generate infrared (IR) radiation beneficial to the skin. Precious serpentine may have antibacterial and deodorizing effects to providing an effect of purifying supply water.

(2) According to the present invention, the permanent magnets of the multi-ionizer may generate ionized water, and the channel of the multi-ionizer may have a trapezoidal cross-sectional shape, such that flowing water is exposed to a magnetic field generated by the permanent magnets for a longer period of time.

(3) According to the present invention, the multi-ionizer may radiate negative ions beneficial to the human body.

DETAILED DESCRIPTION

The present invention relates to a multi-ionizer shower head containing precious serpentine, reference will be made to the present invention in detail, embodiments of which are illustrated in the accompanying drawings and described below, so that those having ordinary knowledge in the art could easily understand the present invention. All terms used in the specification and the appended claims should not be interpreted as being limitative, but should be interpreted as having a meaning consistent with the technical idea the present invention while being variable depending on the intentions of users or practices.

Figure 1:
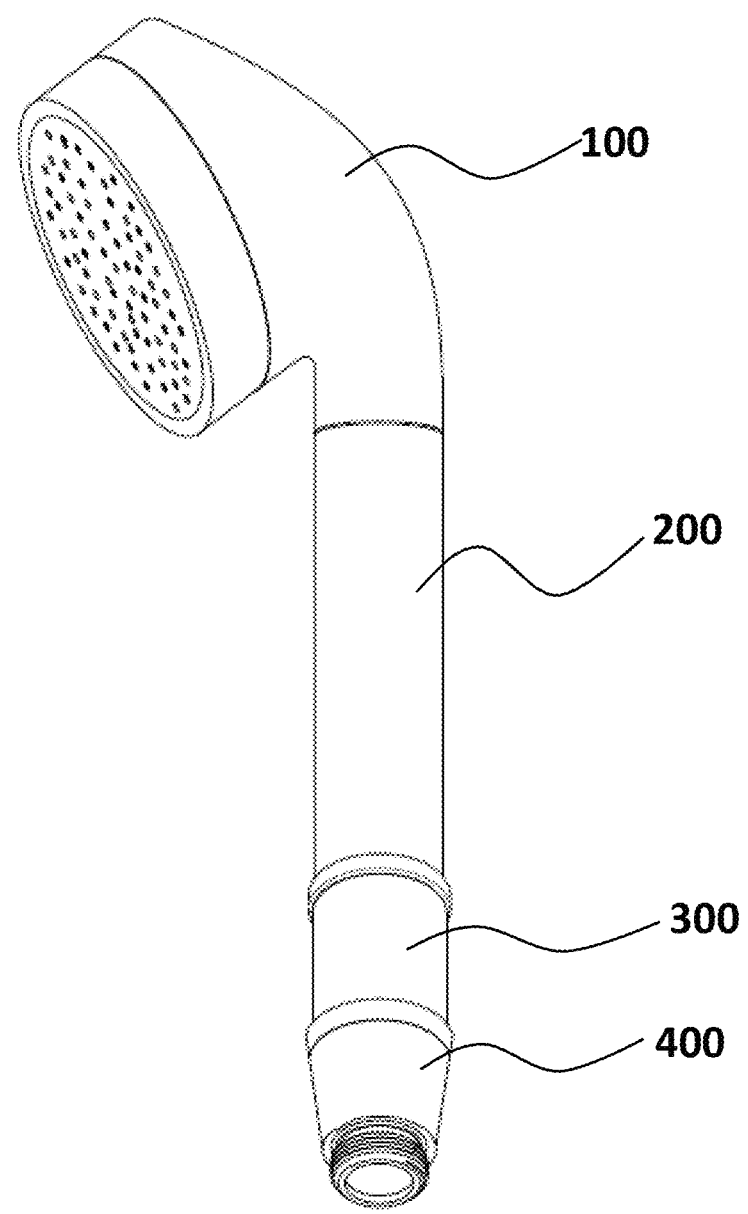
FIG. 1 is a perspective view illustrating a multi-ionizer shower head containing precious serpentine according to an embodiment of the present invention.
Figure 2:
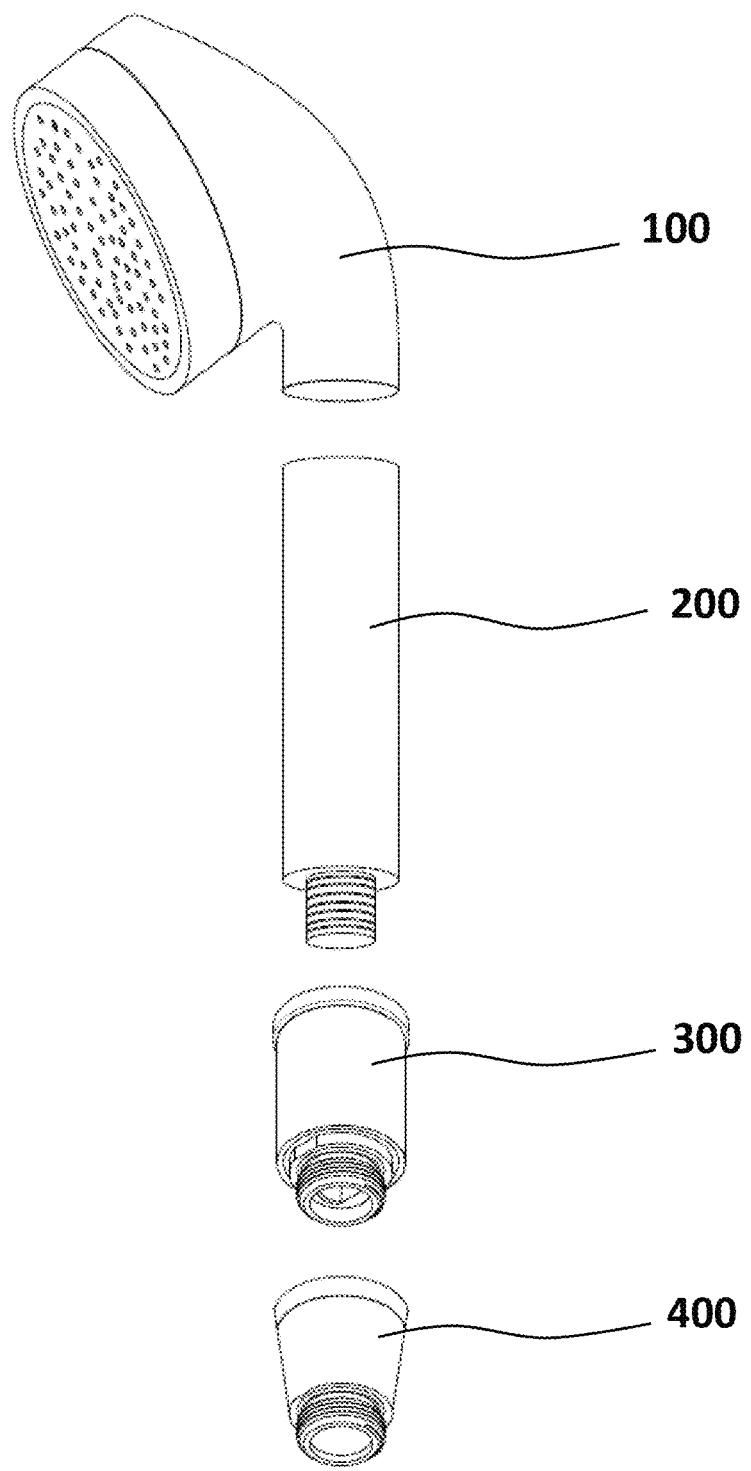
FIG. 2 is an exploded perspective view of the multi-ionizer shower head containing precious serpentine illustrated in FIG. 1.
Figure 3:
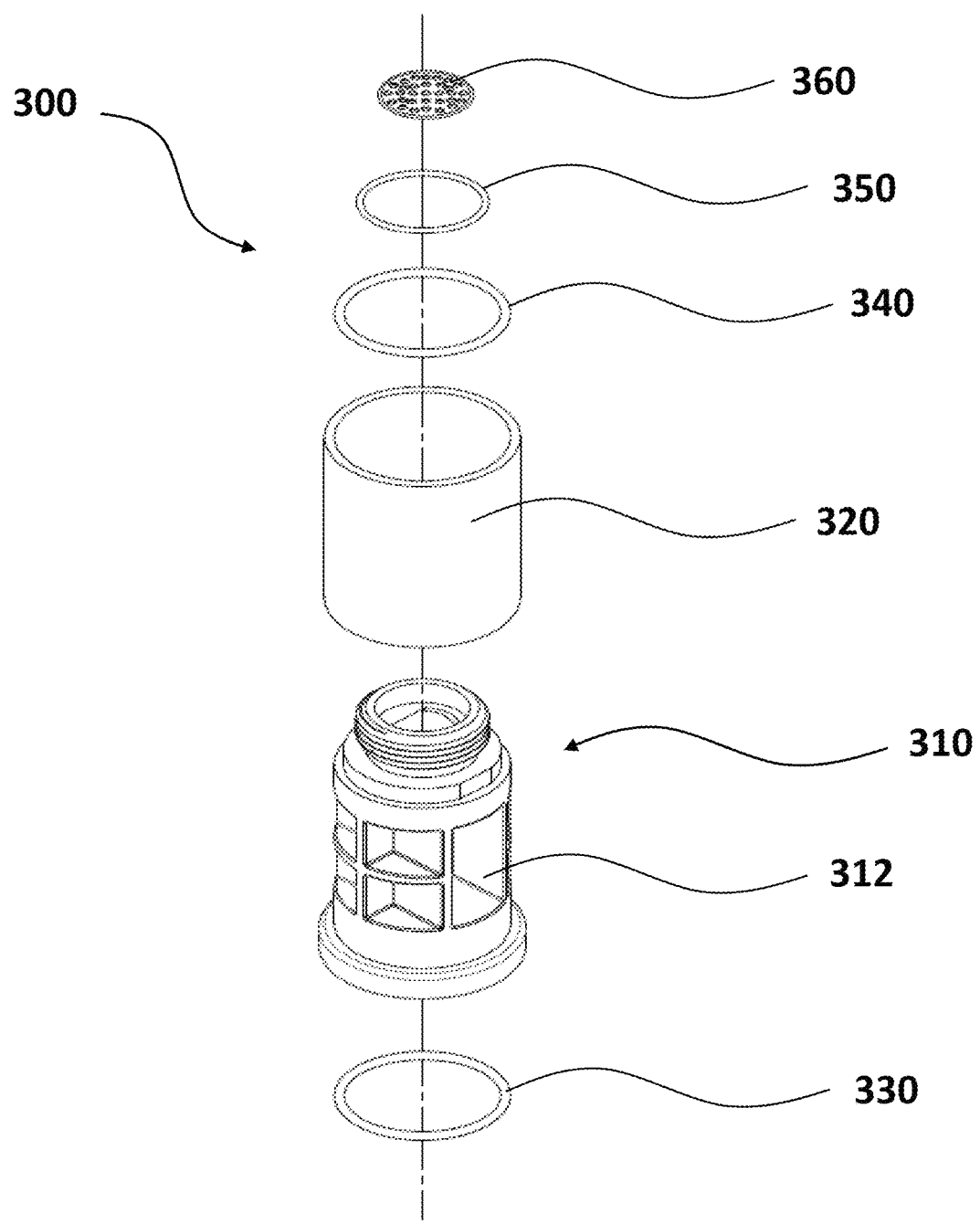
FIG. 3 is an exploded inverted perspective view of the multi-ionizer illustrated in FIG. 2.
Figure 4:
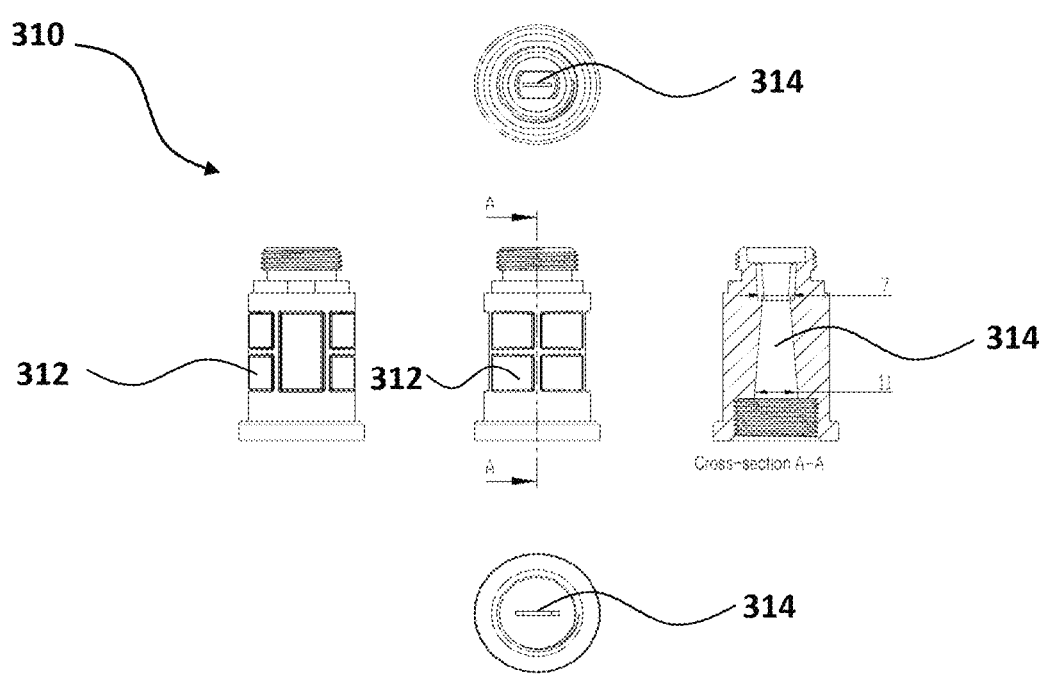
FIG. 4 is front, top, bottom, and cross-sectional views of the multi-ionizer illustrated in FIG. 3.
Figure 5:
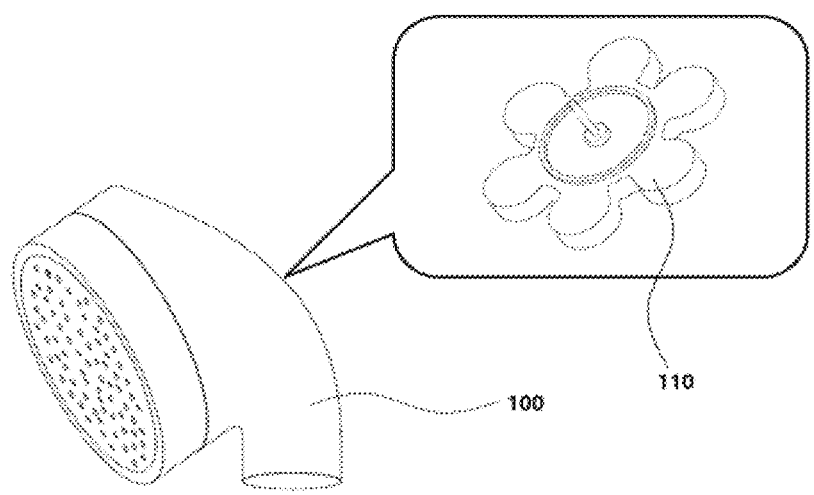
FIG. 5 is an example view illustrating the shower head nozzle illustrated in FIG. 2 and a position in which the ceramic member is disposed.

Hereinafter, a multi-ionizer shower head including a ceramic member containing precious serpentine according to an embodiment of the present invention will be described in detail with reference to FIGS. 1 to 5, wherein:

FIG. 1 is a perspective view illustrating a multi-ionizer shower head containing precious serpentine according to an embodiment of the present invention; FIG. 2 is an exploded perspective view of the multi-ionizer shower head containing precious serpentine illustrated in FIG. 1; FIG. 3 is an exploded inverted perspective view of the multi-ionizer illustrated in FIG. 2; FIG. 4 is front, top, bottom, and cross-sectional views of the multi-ionizer illustrated in FIG. 3; and FIG. 5 is an example view illustrating the shower head nozzle illustrated in FIG. 2 and a position in which the ceramic member is disposed.

A multi-ionizer shower head containing precious serpentine according to the present invention includes a shower head nozzle 100, a cylindrical shower head body 200, a multi-ionizer 300, and an adaptor 400.

The shower head nozzle 100 allows water to be sprayed and includes a ceramic member 110 containing precious serpentine. The ceramic member 110 is rotatably disposed in the interior of the shower head nozzle 100.

The upper portion of the cylindrical shower head body 200 is connected to the lower portion of the shower head nozzle 100. The shower head body 200 has an internal channel through which water is conveyed to the shower head nozzle 100.

The multi-ionizer 300 is screw-coupled to the lower portion of the shower head body 200, has a permanent magnet space accommodating permanent magnets, and allows water to flow through an internal channel 314 thereto to produce ionized water. The multi-ionizer 300 includes a disc-shaped microbubble generator 360 provided in a position through which water is introduced. The microbubble generator 360 is made of the same material as the ceramic member 110 and has a plurality of holes extending through the thickness thereof.

The upper portion of the adaptor 400 is screw-coupled to the lower portion of the multi-ionizer 300. The lower portion of the adaptor 400 is connected to a fixed pipe or a flexible hose.

The multi-ionizer shower head is operated to spray warm water, the temperature of which ranges from 35° C. to 45° C.

The ceramic member 110 disposed inside the shower head nozzle 100 is provided by fitting a shaft of a ceramic member body into a fitting hole provided in an internal portion of the shower head nozzle 100. The ceramic member body has the shape of a disc with a plurality of blades protruding radially and the shaft penetrating through the central portion of the ceramic member body.

The microbubble generator 360 is made of the same material as the ceramic member 110, and has the shape of a disc having the plurality of holes, through which water passes. The holes are spiral holes to facilitate the creation of microbubbles.

In addition, the microbubble generator 360 has a plurality of holes having small diameters. This configuration may pressurize water flowing to the multi-ionizer 300 to increase the temperature of water, thereby improving the effect of far infrared (FIR) radiation. Force applied to water may be increased due to Pascal's principle, thereby inducing FIR radiation from serpentine and quartz porphyry.

The temperature of warm water is limited to the range of from 35° C. to 45° C. In general, inorganic materials having a predetermined or higher temperature emit FIR radiation. Warm water having a temperature similar to that of the human body is used to radiate FIR radiation beneficial to the human body in order to improve the ability of the ceramic member 110 (including the microbubble generator) to emit FIR radiation.

The shower head nozzle 100, the multi-ionizer 300, and the shower head body 200 may be detachably connected to each other by threads, and O-rings may be disposed between the shower head nozzle 100, the multi-ionizer 300, and the shower head body 200 to prevent a water leakage. The magnets may be accommodated in the permanent magnet space 312 of the multi-ionizer 300 and be arranged on both sides of the channel 314 located in the central portion of the multi-ionizer 300 such that different poles of the magnets face each other. For example, one magnet accommodated in one portion of the permanent magnet space 312 may be disposed such that the N pole is located outside with respect to the S pole, while the other magnet accommodated in the other portion of the permanent magnet space 312 may be disposed such that the S pole is located outside with respect to the N pole.

The multi-ionizer 300 may ionize water and generate hydroxyl and oxonium to produce mineral-rich oxygen water having sterilizing and deodorizing effects, thereby allowing the skin of the human body to remain glossy and fresh.

The multi-ionizer 300 includes a housing 310, a cylindrical metal tube 320, upper and lower O-rings 330 and 340, and an adaptor O-ring 350. The housing 310 has the permanent magnet space 312 in the outer surface and the channel in the central portion when viewed in the plan view. The metal tube 320 surrounds the outer surface of the housing 310. The upper and lower O-rings 330 and 340 are attached to the upper and lower portions of the housing 310 to prevent a water leakage. A cylindrical protrusion extends downward from the central portion of the lower portion of the housing 310, and threads are formed on the outer surface of the protrusion. The microbubble generator 360 is fitted into the cylindrical protrusion. The adaptor O-ring 350 is in close contact with the adaptor 400 to prevent the microbubble generator 360 from moving.

The channel 314 of the multi-ionizer 300 has a trapezoidal cross-sectional shape, in which the diameter of the upper portion thereof, through which water is discharged to the shower head body, is greater than the diameter of the lower portion thereof, through which water is introduced, by a predetermined value.

In a case in which the channel 314 has a generally linear shape, the amount of water passing through the multi-ionizer 300 may be limited. In addition, the water may move within the multi-ionizer 300 under a high pressure and at a high flow rate. Thus, the water ionizing ability of the multi-ionizer 300 may be limited. According to the present invention, the channel 314 has the trapezoidal cross-sectional shape, such that the area of the portion of the channel 314, through which water is introduced to the multi-ionizer 300, is smaller than the area of the portion of the channel 314, through which water is discharged to the shower head body 200. This may increase a period of which in which supply water stays within the channel 314 and the degree of exposure of supply water to the magnetic field.

The composition of the ceramic member 110 may include quartz porphyry powder, precious serpentine powder, and a binder.

The binder may be a binder generally used in the fabrication of the material of the ceramic member 110.

The precious serpentine is a semiprecious stone, or a type of metamorphic rock, containing different elements depending on the existing area. According to the present invention, the composition of the precious serpentine includes, by weight, 43 to 78% $SiO_2$, 1.3 to 9% $Al_2O_3$, 0.07 to 3.8% $Fe_2O_3$, 1.1 to 39% MgO, 0.7 to 5.6% CaO, and 0.06 to 5.45% $K_2O$. The result of an analysis test on precious serpentine actually used in the present invention is represented in Table 1.

TABLE 1

| TEST REPORT | |
|---|---|
| 98, Gyoyukwon-ro (Gungang-dong), Gwacheon-si, Gyeonggi-do, 13810, the Republic of Korea | TEL: 82-2-2164-0011 FAX: 82-2-2634-1008 |
| Report No.: TAK-2019-153370 | Receipt Date: Oct. 22, 2019 |
| Client: Kyuyoung Lee | Test Completion Date: Sep. 5, 2019 |

TABLE 1-continued

TEST REPORT

Highhome Ceramic Co. Ltd.
Address: 77-18 (1st Fl.), Maebawi-ro,
Ujeong-eup, Hwaseong-si,
Gyeonggi-do, the
Republic of Korea
Sample Name: Precious
Serpentine, nephrite
(semiprecious stone)

Test Result

| Test Item | Unit | Sample | Result | Test Method |
|---|---|---|---|---|
| $SiO_2$ | % | — | 77.3 | KS L3316: 201 (Applied) |
| $AL_2O_3$ | % | — | 9.00 | KS L3316: 201 (Applied) |
| $Fe_2O_3$ | % | — | 0.08 | KS L3316: 201 (Applied) |
| MgO | % | — | 1.17 | KS L3316: 201 (Applied) |
| CaO | % | — | 5.58 | KS L3316: 201 (Applied) |
| $K_2O$ | % | — | 5.44 | KS L3316: 201 (Applied) |

Usage: Filing

Remarks:
1. This test report represents the sample and the sample name provided by the client but does not guarantee the quality of the article. The authenticity of this test report may be reviewed at our homepage (worw.ktr.orkr) or using QR code.
2. This test report cannot be used for promotion, public relations, advertisement, or the like, and the use of this test report other than the designated usage is banned.
3. Only the original (including reissue) of this test report is valid, and copies and electronic prints/files are only for reference of the result.

Prepared by Yonghyun Kim   Reviewed by Taekyo Seo
Tel: 82-2-2092-3794   Tel: 82-1577-0091 (ARS 1→4)
Sep. 5, 2019
President of Korea Testing & Research Institute
QR code for forgery check A material the same as that of the ceramic member 110 may be attached to the inner surface of the channel of the multi-ionizer 300 or the inner surface of the channel of the shower head body 200, or the housing 310 may be made of the same material as the ceramic member 110.

Figure 6:
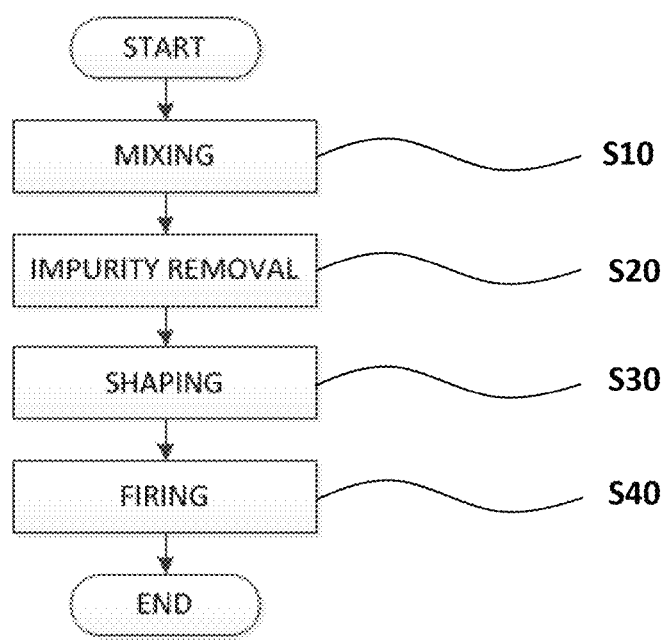
FIG. 6 is a flowchart illustrating a method of fabricating a ceramic material according to an embodiment of the present invention.

FIG. 6 is a flowchart illustrating a method of fabricating the ceramic member according to an embodiment of the present invention. The method of fabricating the ceramic member will be described with reference to FIG. 6.

The method of fabricating the ceramic member includes:
a) mixing step S10 of inputting quartz porphyry powder and precious serpentine powder at a weight ratio of 6:4 to 9:1 to a ball mill mixer and stirring and mixing (hereinafter, collectively referred to as "mixing") the quartz porphyry powder and the precious serpentine powder;
b) impurity removal step S20 of inputting the mixture obtained in the mixing step S10 and water to a chamber of a spray dryer to evaporate moisture and recover the dried mixture;
c) shaping step S30 of inputting the mixture, from which the impurity is removed in the impurity removal step S20, and a binder by to a mold and shaping the mixture; and
d) firing step S40 of firing the mixture shaped in the shaping step S30, thereby fabricating a ceramic member.

The impurity removal step S20 includes mixing the quartz porphyry powder and the precious serpentine powder with water and removing moisture from the mixture by spraying the mixture upwards, so that only the mixture of the quartz porphyry powder and the precious serpentine powder is left.

The mixing step S10 is performed for 68 to 76 hours so that the quartz porphyry powder and the precious serpentine powder have a particle size of 38 to 42 mesh. In the impurity removal step S20, the mixture and water are sprayed into the chamber of the spray dryer. Here, the chamber has an internal temperature of 120 to 150° C. In the firing step S40, the firing is performed at a temperature of 1150 to 1200° C. for 4 to 6 hours.

When the particle size of the quartz porphyry powder and the precious serpentine powder are 38 mesh or more, the surface of the ceramic member 110 is coarse. With increasing the particle size, the bonding force between powder particles is reduced. When the particle size 42 mesh or less, the effect obtainable by the ceramic member may be reduced. Accordingly, the quartz porphyry powder and the precious serpentine powder may have a particle size of 38 to 42 mesh.

In addition, in the firing step S40, the firing may be performed for two or three times for 4 to 6 hours, since the ability of precious serpentine to emit negative ions and FIR radiation is reduced if the firing is performed for a short period of time or 7 hours or more.

According to another aspect of the present invention, the ceramic member 110 may be fabricated by adding a mineral emitting radiation in the range of terahertz, such as monazite or tourmaline, to the mixture of the raw materials. When the mineral emitting radiation in the range of terahertz is added, the additional mineral may be added at a ratio of 0.01 to 0.1 of the total weight of the quartz porphyry powder and the precious serpentine powder. This is because, when the content is less than 0.01, it may be difficult to obtain the intended effect, and when the content is more than 0.1, it may be harmful to the human body.

As set forth above, in the multi-ionizer shower head including precious serpentine according to the present invention, the ceramic member containing precious serpentine and quartz porphyry may be disposed inside the shower head to generate IR radiation beneficial to the skin. Precious serpentine may have antibacterial and deodorizing effects to providing an effect of purifying supply water. The permanent magnets of the multi-ionizer may generate ionized water, and the channel of the multi-ionizer may have a trapezoidal cross-sectional shape, such that flowing water is exposed to a magnetic field generated by the permanent magnets for a longer period of time. The multi-ionizer may radiate negative ions beneficial to the human body.

Although the specific embodiments of the present invention have been described for illustrative purposes with reference to the accompanying drawings, those having ordinary knowledge in the art will appreciate that various modifications, additions, and substitutions are possible, without departing from the scope and spirit of the present invention equivalent to those disclosed in the accompanying claims.

What is claimed is:

1. A multi-ionizer shower head comprising:
   a shower head nozzle allowing water to be sprayed and including a ceramic member containing precious serpentine, the ceramic member being rotatably disposed in an interior of the shower head nozzle;
   a cylindrical shower head body, with an upper portion thereof being connected to a lower portion of the shower head nozzle, an internal channel of the shower head body allowing water be conveyed to the shower head nozzle therethrough;
   a multi-ionizer screw-coupled to a lower portion of the shower head body, having a permanent magnet space accommodating permanent magnets, and allowing water to flow through an internal channel thereof to produce ionized water, the multi-ionizer including a disc-shaped microbubble generator provided in a position through which water is introduced, the microbubble generator being made of the same material as the ceramic member and having a plurality of holes extending through the thickness thereof; and
   an adaptor, with an upper portion thereof being screw-coupled to a lower portion of the multi-ionizer, and a lower portion of the adaptor being connected to a fixed pipe or a flexible hose,
   wherein the multi-ionizer shower head is operated to spray warm water, the temperature of which ranges from 35° C. to 45° C.,
   wherein the channel of the multi-ionizer has a trapezoidal cross-sectional shape, in which the diameter of the upper portion thereof, through which water is discharged to the shower head body, is greater than the diameter of the lower portion thereof, through which water is introduced, by a predetermined value,
   wherein the magnets are accommodated in the permanent magnet space of the multi-ionizer to be arranged on both sides of the channel located in a central portion of the multi-ionizer such that different poles of the magnets face each other, wherein one magnet accommodated in one portion of the permanent magnet space is disposed such that an N pole thereof is located outside with respect to an S pole thereof, while the other magnet accommodated in the other portion of the permanent magnet space is disposed such that an S pole thereof is located outside with respect to an N pole thereof,
   wherein the shower head nozzle, the shower head body, the multi-ionizer, and the adaptor are attachable to and detachable from each other,
   wherein the ceramic member comprises quartz porphyry powder, precious serpentine powder, and a binder,
   wherein the ceramic member is fabricated by:
   inputting the quartz porphyry powder and the precious serpentine powder at a weight ratio of 6:4 to 9:1 to a ball mill mixer and mixing the quartz porphyry powder and the precious serpentine powder;
   inputting a mixture obtained in the mixing and water to a chamber of a spray dryer, evaporating moisture, and removing impurity to recover the dried mixture;
   inputting the mixture, from which the impurity is removed, and a binder by to a mold and shaping the mixture; and
   firing the shaped mixture, thereby fabricating a ceramic member,
   wherein the microbubble generator is made of the same material as the ceramic member, and the plurality of holes, through which water passes, are spiral holes, and
   wherein the precious serpentine comprises, by weight, 43 to 78% $SiO_2$, 1.3 to 9% $Al_2O_3$, 0.07 to 3.8% $Fe_2O_3$, 1.1 to 39% MgO, 0.7 to 5.6% CaO, and 0.06 to 5.45% $K_2O$.

2. The multi-ionizer shower head according to claim 1, wherein the multi-ionizer includes:
   a housing having the permanent magnet space in an outer surface and the channel in a central portion when viewed in a plan view;
   a cylindrical metal tube surrounding an outer surface of the housing;
   upper and lower O-rings attached to upper and lower portions of the housing to prevent a water leakage; and
   wherein a cylindrical protrusion extends downward from a central portion of a lower portion of the housing, threads are formed on an outer surface of the protrusion, and the microbubble generator is fitted into the cylindrical protrusion; and
   an adaptor O-ring in close contact with the adaptor to prevent the microbubble generator from moving.

3. The multi-ionizer shower head according to claim 1, wherein the mixing is performed for 68 to 76 hours so that the quartz porphyry powder and the precious serpentine powder have a particle size of 38 to 42 mesh and is performed by spraying the mixture and water into the chamber of the spray dryer, with the chamber having an internal temperature of 120 to 150° C., and the firing is performed at a temperature of 1150 to 1200° C. for 4 to 6 hours.

4. The multi-ionizer shower head according to claim 1, wherein a material the same as that of the ceramic member is attached to an inner surface of the channel of the multi-ionizer or an inner surface of the channel of the shower head body, or the housing is made of the same material as the ceramic member.

* * * * *